(12) United States Patent
Beck et al.

(10) Patent No.: US 8,727,929 B2
(45) Date of Patent: May 20, 2014

(54) MULTISTEP GEAR MECHANISM OF PLANETARY DESIGN

(75) Inventors: Stefan Beck, Eriskirch (DE); Gerhard Gumpoltsberger, Friedrichshafen (DE); Christian Sibla, Friedrichshafen (DE); Michael Wechs, Lindau (DE); Juergen Wafzig, Eriskirch (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 13/995,795

(22) PCT Filed: Nov. 21, 2011

(86) PCT No.: PCT/EP2011/070521
§ 371 (c)(1),
(2), (4) Date: Jun. 19, 2013

(87) PCT Pub. No.: WO2012/084376
PCT Pub. Date: Jun. 28, 2012

(65) Prior Publication Data
US 2013/0274060 A1   Oct. 17, 2013

(30) Foreign Application Priority Data
Dec. 21, 2010  (DE) .......................... 10 2010 063 634

(51) Int. Cl.
*F16H 3/44* (2006.01)

(52) U.S. Cl.
USPC ......................................................... 475/280

(58) Field of Classification Search
USPC ................. 475/280, 275, 276, 331, 269, 271
See application file for complete search history.

(56) References Cited

U.S. PATENT DOCUMENTS

| 4,395,925 A | 8/1983 | Gaus |
| 6,634,980 B1 | 10/2003 | Ziemer |

(Continued)

FOREIGN PATENT DOCUMENTS

| DE | 29 36 969 A1 | 4/1981 |
| DE | 199 49 507 A1 | 4/2001 |

(Continued)

OTHER PUBLICATIONS

Gerhard Gumpoltsberger, "Systematic Synthesis and Evaluation of Multi-stage Planetary Transmissions" Mechanical Engineering of the Technical University of Chemnitz, Jan. 22, 2007.

(Continued)

*Primary Examiner* — David D Le
*Assistant Examiner* — David J Hlavka
(74) *Attorney, Agent, or Firm* — Davis & Bujold, PLLC; Michael J. Bujold

(57) ABSTRACT

A multi-step transmission having a housing accommodating eight shafts and four planetary gearsets (4, 5, 6, 7), and at least six shift elements comprising brakes and clutches which implement different transmission ratios between a drive shaft and output shaft. A carrier of gearset (4) is connected to shaft (14) which can be fixed, via brake (8), to the housing and further is connectable, via a first clutch, to shaft (15) which is coupled to a carrier of gearset (5) and is connectable, via a second clutch, to the drive shaft. A ring gear of gearset (6) is coupled to shaft (16) which can be fixed, via brake (9), to the housing. The drive shaft is additionally coupled to a sun gear of gearset (5). A ring gear of gearset (5) is connected to shaft (17). The gearset (5) is a plus planetary gearset.

15 Claims, 4 Drawing Sheets

(56) References Cited

U.S. PATENT DOCUMENTS

| | | |
|---|---|---|
| 7,341,537 B2 | 3/2008 | Klemen |
| 7,549,942 B2 | 6/2009 | Gumpoltsberger |
| 7,695,398 B2 | 4/2010 | Phillips et al. |
| 7,699,743 B2 | 4/2010 | Diosi et al. |
| 8,210,981 B2 | 7/2012 | Bauknecht et al. |
| 8,241,171 B2* | 8/2012 | Gumpoltsberger et al. .. 475/284 |
| 8,277,356 B2 | 10/2012 | Hart et al. |
| 2002/0086765 A1* | 7/2002 | Takagi et al. ............... 475/276 |
| 2005/0215386 A1 | 9/2005 | Haka |
| 2007/0072732 A1 | 3/2007 | Klemen |
| 2008/0015077 A1* | 1/2008 | Kamm et al. ............... 475/269 |
| 2008/0274853 A1 | 11/2008 | Raghavan |
| 2009/0017965 A1 | 1/2009 | Phillips et al. |
| 2009/0054194 A1 | 2/2009 | Phillips et al. |
| 2012/0122627 A1* | 5/2012 | Gumpoltsberger et al. .. 475/276 |
| 2012/0135834 A1* | 5/2012 | Gumpoltsberger et al. .. 475/276 |
| 2012/0149526 A1* | 6/2012 | Gumpoltsberger et al. .. 475/276 |
| 2013/0123060 A1* | 5/2013 | Kamm et al. ............... 475/275 |

FOREIGN PATENT DOCUMENTS

| | | |
|---|---|---|
| DE | 10 2005 010 210 A1 | 9/2006 |
| DE | 10 2006 024 442 A1 | 11/2006 |
| DE | 10 2005 032 884 A1 | 1/2007 |
| DE | 10 2006 006 637 A1 | 9/2007 |
| DE | 10 2008 015 919 A1 | 10/2008 |
| DE | 10 2008 019 136 A1 | 11/2008 |
| DE | 10 2008 031 970 A1 | 1/2009 |
| DE | 10 2008 000 428 A1 | 9/2009 |
| DE | 10 2009 047 277 A1 | 6/2011 |
| DE | 10 2009 047 278 A1 | 6/2011 |
| JP | 2001-041296 A | 2/2001 |
| JP | 2006-266389 A | 10/2006 |
| JP | 2008-215407 A | 9/2008 |
| JP | 2009-270667 A | 11/2009 |

OTHER PUBLICATIONS

German Search Report Corresponding to 10 2010 063 670.3 mailed Aug. 22, 2011.
German Search Report Corresponding to 10 2010 063 643.6 mailed Aug. 22, 2011.
German Search Report Corresponding to 10 2010 063 632.0 mailed Dec. 14, 2011.
German Search Report Corresponding to 10 2010 063 634.7 mailed Dec. 14, 2011.
International Search Report Corresponding to PCT/EP2011/070517 mailed Jan. 27, 2012.
International Search Report Corresponding to PCT/EP2011/070518 mailed Jan. 27, 2012.
International Search Report Corresponding to PCT/EP2011/070519 mailed Mar. 1, 2012.
International Search Report Corresponding to PCT/EP2011/070521 mailed Mar. 2, 2012.
Written Opinion Corresponding to PCT/EP2011/070517 mailed Jan. 27, 2012.
Written Opinion Corresponding to PCT/EP2011/070518 mailed Jan. 27, 2012.
Written Opinion Corresponding to PCT/EP2011/070519 mailed Mar. 1, 2012.
Written Opinion Corresponding to PCT/EP2011/070521 mailed Mar. 2, 2012.

* cited by examiner

| Gear | Engaged shift elements | | | | | | Transmisson ratio i | Gear increment φ |
|------|---|---|---|---|---|---|------|------|
| | Brake | | | Clutch | | | | |
| | 8 | 9 | 10 | 11 | 12 | 13 | | |
| 1 | | × | × | × | | | 5.277 | |
| | | | | | | | | 1.627 |
| 2 | | × | | × | × | | 3.244 | |
| | | | | | | | | 1.466 |
| 3 | | × | × | | × | | 2.213 | |
| | | | | | | | | 1.344 |
| 4 | | × | | | × | × | 1.646 | |
| | | | | | | | | 1.336 |
| 5 | | | × | | × | × | 1.232 | |
| | | | | | | | | 1.232 |
| 6 | | | | × | × | × | 1.000 | |
| | | | | | | | | 1.156 |
| 7 | | × | | × | | × | 0.865 | |
| | | | | | | | | 1.215 |
| 8 | × | | | × | | × | 0.712 | |
| | | | | | | | | 1.213 |
| 9 | × | | × | | | × | 0.587 | |
| R | × | × | × | | | | -4.367 | Total 8.995 |

US 8,727,929 B2

MULTISTEP GEAR MECHANISM OF PLANETARY DESIGN

This application is a National Stage completion of PCT/EP2011/070521 filed Nov. 21, 2011, which claims priority from German patent application serial no. 10 2010 063 634.7 filed Dec. 21, 2010.

FIELD OF THE INVENTION

The invention relates to a multi-stage transmission of planetary design, particularly for a motor vehicle, having a housing, in which eight rotatable shafts and four planetary gear sets are accommodated, and with at least six shift elements which are formed by brakes and clutches, and by means of the targeted actuation thereof, different transmission ratios can represented between a drive shaft and an output shaft.

BACKGROUND OF THE INVENTION

Multi-stage transmissions of this type are preferably used with automatic transmissions of motor vehicles, wherein the effective power flow within the planetary gear sets in the respective gear step is defined by a targeted actuation of the shift elements. Here, in the case of an automatic transmission, the planetary gear sets are typically additionally connected to a start-up element, such as, for example, a hydrodynamic torque converter or a fluid coupling, that is subject to a slip effect and is provided optionally with a lock-up clutch.

The document, DE 10 2008 000 428 A1, discloses a multi-stage transmission of planetary design in which four planetary gear sets, and a total of eight rotatable shafts, one of which represents a drive shaft and another represents an output shaft of the multi-stage transmission, are disposed in a housing. Furthermore, there are at least six shift elements in the region of the shafts, and by the targeted actuation thereof, the power flow within the four planetary gear sets varies and thus, different transmission ratios can be represented between the drive shaft and the output shaft. By this means, a total of nine forward gears and one reverse gear can be engaged.

SUMMARY OF THE INVENTION

The objective of the present invention is to propose a multi-stage transmission of the initially named type, with which at least nine forward gears and one reverse gear can be represented, and in which particularly the number of components is reduced and thus the weight and the production expense are minimized. In addition, it should be possible to represent a favorable transmission ratio range, and the loading of the individual transmission elements should be reduced. Finally, a high gearing efficiency should be attainable.

Accordingly, a multi-stage transmission in planetary design according to the invention is proposed in which a drive shaft and an output shaft and a further six rotatable shafts and four planetary gear sets are accommodated in a housing. The planetary gear sets, viewed here in the axial direction, are disposed in the sequence of first planetary gear set, second planetary gear set, third planetary gear set, fourth planetary gear set, wherein the first, third and fourth planetary gear sets are each preferably designed as a minus planetary gear set, whereas the second planetary gear set is preferably implemented as a plus planetary gear set. However it is also conceivable to convert individual or several minus planetary gear sets into plus planetary gear sets at places where this is allowed by the connectability, if at the same time, a carrier connection and a ring gear connection are exchanged, and the value of the standard transmission ratio is increased by one, or conversely, implementing the plus planetary gear set as a minus planetary gear set.

As is well known, a simple minus planetary gear set comprises a sun gear, a ring gear, and a carrier which rotatably supports the planetary gears, which each mesh with the sun gear and the ring gear. In the case of a fixed carrier, a direction of rotation of the ring gear is counter to that of the sun gear.

In contrast to this, a simple plus planetary gear set comprises a sun gear, a ring gear and a carrier, which rotatably supports inner and outer planetary gears. Here, all inner planetary gears mesh with the sun gear, and all outer planetary gears mesh with the ring gear, wherein, additionally, each of the inner planetary gears is in engagement with an outer planetary gear. In the case of a fixed carrier, the ring gear has the same direction of rotation as the sun gear.

According to the invention, a carrier of a first planetary gear set is connected to a third shaft, which can be fixed to the housing via a first brake and additionally, on the one hand, can be releasably connected by means of a first clutch to a fourth shaft, which is coupled to a carrier of the second planetary gear set, and on the other hand, can be connected via a second clutch to the drive shaft. Additionally, a ring gear of the third planetary gear set is coupled to a fifth shaft, which can be fixed to the housing via a second brake. Furthermore, the drive shaft is additionally coupled to a sun gear of the second planetary gear set, and a ring gear of the second planetary gear set is connected to a sixth shaft.

According to one embodiment of the invention, the fourth shaft additionally connects a sun gear of the third planetary gear set to a sun gear of a fourth planetary gear set. Moreover, a sixth shaft is connected to a ring gear of the first planetary gear set, and the drive shaft also can be connected via a third clutch to a seventh shaft, which is connected to a carrier of the fourth planetary gear set. Additionally, the output shaft connects a ring gear of the fourth planetary gear set to a carrier of the third planetary gear set, whereas a sun gear of the first planetary gear set is coupled to an eighth shaft, which can be fixed to the housing by means of a third brake.

According to an alternative embodiment of the invention, the fourth shaft additionally connects a sun gear of the third planetary gear set to a sun gear of the fourth planetary gear set, wherein the sixth shaft is additionally connected to a ring gear of the first planetary gear set and the drive shaft is additionally coupled to a carrier of the fourth planetary gear set. Additionally, the output shaft is operatively connected to a carrier of the third planetary gear set and can be releasably connected via a third clutch to a seventh shaft, which is coupled to a ring gear of the fourth planetary gear set. Finally, a sun gear of the first planetary gear set is coupled to an eighth shaft, which can be fixed to the housing by means of a third brake.

According to the invention, the fourth shaft, corresponding to a further embodiment of the invention, is additionally coupled to a sun gear of the third planetary gear set, and can, by means of a third clutch, be connected to a seventh shaft, which is coupled to a sun gear of a fourth planetary gear set. Additionally, the sixth shaft is connected to a ring gear of the first planetary gear set and the drive shaft is coupled to a carrier of the fourth planetary gear set, the ring gear of which is connected via the output shaft to a carrier of the third planetary gear set. Finally, a sun gear of the first planetary gear set is coupled to an eighth shaft, which can be fixed to the housing by means of a third brake.

In the cases of these embodiments, a first forward gear results from engaging the second and the third brakes and the first clutch, whereas a second forward gear is engaged by actuating second brake, and the first and second clutch. Additionally, a third forward gear can be selected by engaging the second and third brakes, and the second clutch. Furthermore, a fourth forward gear results from actuating the second brake, and the second and third clutch; a fifth forward gear results from engaging the third brake, and the second and third clutch. A sixth forward gear is engaged by actuating all clutches; a seventh forward gear can be selected by engaging the third brake and the first and third clutch. Furthermore, an eighth forward gear results from actuating the first brake, and the first and third clutch, whereas a ninth forward gear is selected by engaging the first and third brake, and the third clutch. Finally, a reverse gear results from engaging all brakes.

According to an alternative development of this embodiment, the fourth shaft also connects a sun gear of the third planetary gear set to a sun gear of a fourth planetary gear set, wherein the drive shaft can be coupled via a third clutch to a seventh shaft, which is connected to a carrier of the fourth planetary gear set. Additionally, a ring gear of the first planetary gear set is coupled to an eighth shaft, which can be connected by means of a fourth clutch to the seventh shaft. Finally, the output shaft connects a ring gear of the fourth planetary gear set to a carrier of the third planetary gear set, and a sun gear of the first planetary gear set is coupled to the housing in a rotationally fixed manner.

According to a further embodiment of the invention, the fourth shaft additionally connects a sun gear of the third planetary gear set to a sun gear of the fourth planetary gear set, whereas the output shaft is coupled to a carrier of the third planetary gear set and via a third clutch can be releasably coupled to a seventh shaft, which is coupled to a ring gear of the fourth planetary gear set. Additionally, a ring gear of the first planetary gear set is connected to an eighth shaft, which can be coupled via a fourth clutch to the sixth shaft. Finally, the drive shaft is coupled to a carrier of the fourth planetary gear set and a sun gear of the first planetary gear set is connected to the housing in a rotationally fixed manner.

According to a further embodiment, the fourth shaft is additionally coupled to a sun gear of the third planetary gear set and can be connected by means of a third clutch to a seventh shaft, which is coupled to a sun gear of the fourth planetary gear set. A ring gear of the first planetary gear set is connected to an eighth shaft, which can be connected via a fourth clutch to the sixth shaft. Additionally, the output shaft couples a ring gear of the fourth planetary gear set to a carrier of the third planetary gear set. Finally, the drive shaft is connected to a carrier of the fourth planetary gear set, and a sun gear of the first planetary gear set is coupled to the housing in a rotationally fixed manner.

In the cases of these embodiments of the invention, a first forward gear results from engaging the second brake and the first and fourth clutch, whereas a second forward gear is engaged by actuating the second brake, and the first and second clutch. A third forward gear can be selected by engaging the second brake, and the second and fourth clutch. Furthermore, a fourth forward gear results from actuating the second brake, and the second and third clutch; a fifth forward gear results from engaging the second, third and fourth clutch. A sixth forward gear is shifted to by actuating the first, second and third clutch; whereas a seven forward gear can be selected by engaging the first, third and fourth clutch. Furthermore, an eighth forward gear results from actuating the first brake, and the first and third clutch, whereas a ninth forward gear is selected by engaging the first brake, and the third and fourth clutch. Finally, a reverse gear results from engaging all brakes and the fourth clutch.

In a further development of the invention, the shift elements are implemented as multi-disk shift elements or claw shift elements. As a result, the shift elements can be advantageously implemented in a space saving and robust manner.

By means of the design of a multi-stage transmission according to the invention it is possible to implement a total of ten selectable gears with a low number of components, and thus to keep the production costs and the weight low. In addition, transmission ratios suitable particularly for passenger vehicles and a broad transmission ratio range of the multi-stage transmission result which leads to an increase of driving comfort and a decrease of fuel consumption.

Furthermore, a multi-stage transmission according to the invention is characterized by low absolute and relative rotational speeds, and low planetary gear set torques and shift element torques, which have a positive effect on the dimensioning and the service life of the transmission. In addition, a good transmission ratio series, particularly a slightly progressive transmission ratio series, and also good gearing efficiencies, can be attained.

BRIEF DESCRIPTION OF THE DRAWINGS

Additional measures improving the invention are represented in the following in more detail together with the description of preferred embodiments of the invention. Shown are.

DETAILED DESCRIPTION OF THE PREFERRED EMBODIMENTS

Figures 1, 2:
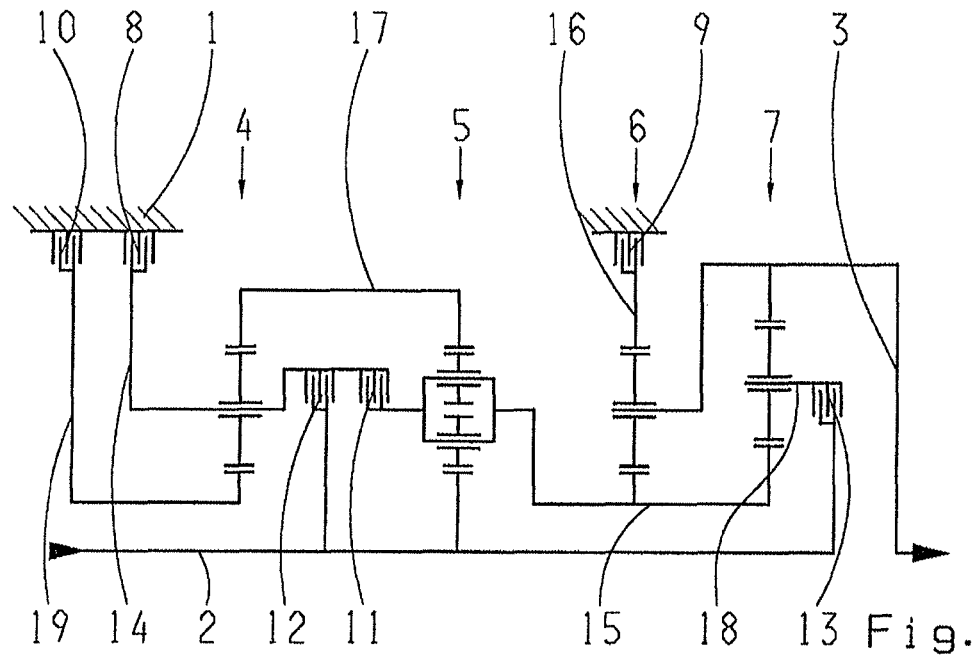
FIG. 1 a schematic view of a first preferred embodiment of a multi-stage transmission according to the invention.
FIG. 2 an example of a shift pattern for a multi-stage transmission according to FIG. 1.

FIG. 1 shows a first preferred embodiment of a multi-stage transmission according to the invention in which a drive shaft 2, an output shaft 3, and four planetary gear sets 4, 5, 6 and 7 are accommodated in a housing 1. Here, the first planetary gear set 4, the third planetary gear set 6 and the fourth planetary gear set 7 are each designed as minus planetary gear sets, whereas the second planetary gear set 5 is implemented as a plus planetary gear set. According to the invention, however, the minus planetary gear sets can also be individually implemented as a plus planetary gear set if a carrier and a ring gear connection are exchanged and, simultaneously, the value of the stationary transmission ratio is increased by one in comparison to the embodiment as a minus planetary gear set. Conversely, the second planetary gear set 5 can also be implemented as a minus planetary gear set, in that, likewise, a carrier and a ring connection are exchanged and the value of the stationary transmission ratio is reduced by one. In the present case, the planetary gear sets 4, 5, 6, and 7, viewed axially, are disposed in the sequence 4, 5, 6, 7.

As further seen in FIG. 1, the multi-stage transmission according to the invention comprises a total of six shift elements, which are formed as three brakes 8, 9 and 10, and three clutches 11, 12 and 13. A spatial disposition of these shift elements can be arbitrary, and is limited only by the dimensions and the outer shape. In this case, the brakes 8, 9 and 10 and also the clutches 11, 12 and 13 are each implemented as multi-disk shift elements, wherein according to the invention, an implementation as claw shift elements is also conceivable.

By targeted actuation of the shift elements, a selective shifting of different transmission ratios can be implemented between the drive shaft 2 and the output shaft 3, wherein here a total of nine forward gears and one reverse gear can be represented. In addition, a total of eight rotatable shafts are accommodated in the housing 1, specifically the drive shaft 2 and the output shaft 3, a third shaft 14, a fourth shaft 15, a fifth shaft 16, a sixth shaft 17, a seventh shaft 18, and an eighth shaft 19.

According to the invention, in the case of the multi-stage transmission according to FIG. 1, a carrier of the first planetary gear set 4 is connected to the third shaft 14, which can be fixed to the housing 1 via the first brake 8. Additionally, the third shaft 14 can be coupled via the first clutch 11 to the fourth shaft 15, and can be connected by means of the second clutch 12 to the drive shaft 2. The fourth shaft 15, in turn, is coupled to a carrier of the second planetary gear set 5 and, in further progression, connects a sun gear of the third planetary gear set 6 to a sun gear of the fourth planetary gear set 7. Furthermore, a ring gear of the third planetary gear set 6 is connected to a fifth shaft 16, which can be fixed to the housing 1 using the second brake 9.

As seen in FIG. 1, the sixth shaft 17 connects a ring gear of the first planetary gear set 4 to a ring gear of the second planetary gear set 5. The drive shaft 2, along with a possible connection to the third shaft 14 via the second clutch 12, is connected to a sun gear of the second planetary gear set 5 and additionally can be connected via the third clutch 13 to the seventh shaft 18, which is coupled to a carrier of the fourth planetary gear set 7. Additionally, a sun gear of the first planetary gear set 4 is connected to an eighth shaft 19, which can be fixed to the housing 1 using the third brake 10. Finally, the output shaft 3 connects a carrier of the third planetary gear set 6 to a ring gear of the fourth planetary gear set 7.

Here, preferably the first clutch 11 and the second clutch 12, viewed axially, are disposed next to each other and between the first planetary gear set 4 and the second planetary gear set 5. The first brake 8 and the third brake 10 are disposed upstream in the axial direction of the first planetary gear set 4, whereas the second brake 9, viewed axially, is placed above the third planetary gear set 6. The third clutch 13 is disposed adjacent in the axial direction to the fourth planetary gear set 7.

FIG. 2 shows an example shift pattern of a multi-stage transmission according to FIG. 1, wherein for shifting each of the total of ten gears, in each case three of the six shift elements are engaged, and for shifting into the respectively next gear, the state of two shift elements is changed. Here, the shift pattern of the respective transmission ratios i of the individual gear steps, and the resulting gear increments φ to the respectively next higher gear, can be taken as an example. Further, the transmission ratio spread of 8.995 can be read from FIG. 2.

The first forward gear results from engaging the second brake 9 and the third brake 10, and the first clutch 11, whereas for shifting into the next higher second forward gear, the third brake 10 is disengaged and the second clutch 12 is engaged. The third forward gear is shifted to, in that starting from the second forward gear, the first clutch 11 is disengaged and the third brake 10 is engaged. Then, a subsequent fourth forward gear results by disengaging the third brake 10 and engaging the third clutch 13, whereas for selecting the fifth forward gear, the second brake 9 is disengaged and the third brake 10 is engaged again. The six forward gear results in that, starting from the fifth forward gear, the third brake 10 is disengaged again and the first clutch 11 is engaged. Then, the following seventh forward gear is shifted to by disengaging the second clutch 12 and engaging the third brake 10, whereas the then subsequent eighth forward gear is selected by again disengaging the third brake 10 and engaging the first brake 8. Finally, the ninth forward gear results in that, starting from the eighth forward gear, the first clutch 11 is disengaged and the third brake 10 is actuated. The reverse gear is shifted to in that all three brakes 8, 9 and 10 are actuated.

Figure 3:
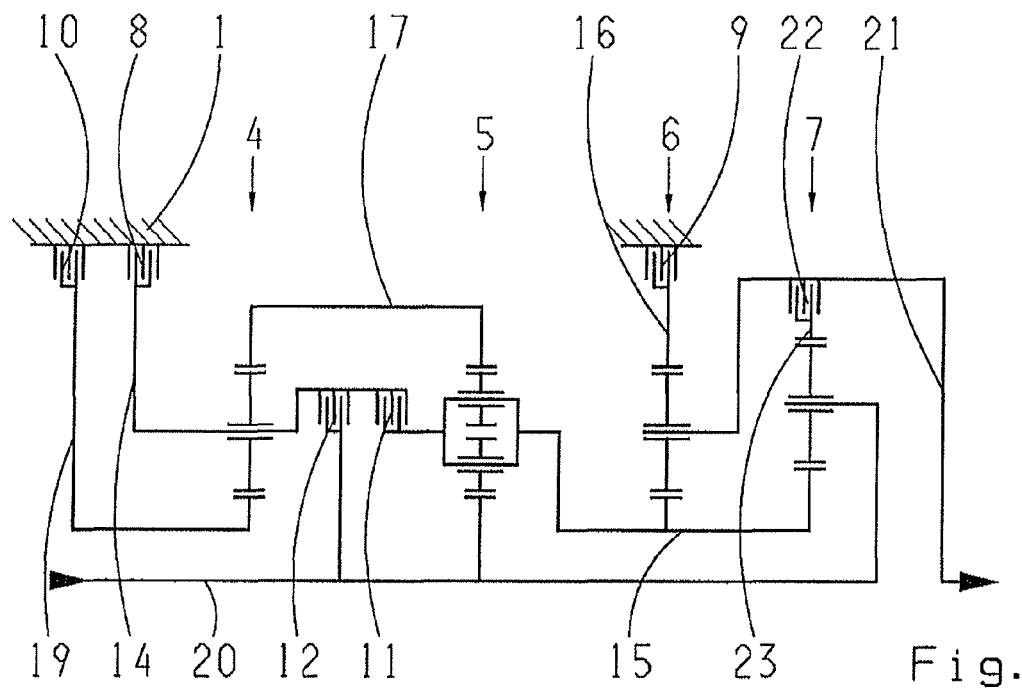
FIG. 3 a schematic view of a second preferred embodiment of a multi-stage transmission according to the invention.

FIG. 3 shows a further, second embodiment of a multi-stage transmission according to the invention. In contrast to the example embodiment according to FIG. 1, in this case a drive shaft 20, along with a coupling to a sun gear of the second planetary gear set 5 and connectability to the third shaft 14, is directly coupled to a carrier of the fourth planetary gear set 7. In addition, an output shaft 21 can be connected via a third clutch 22 to a seventh shaft 23, which is coupled to a ring gear of the fourth planetary gear set 7.

The design according to the second embodiment according to FIG. 3, is effectively the same as the first embodiment according to FIG. 1, such that in the individual gears the transmission ratios i, and the gear increments φ according to the example shift pattern in FIG. 2 can be attained. The shifting of the individual gears also differs with respect to the description of FIG. 2 only in that, instead of the third clutch 13 in FIG. 1, the third clutch 22 in FIG. 3 is actuated in each case.

Figure 4:
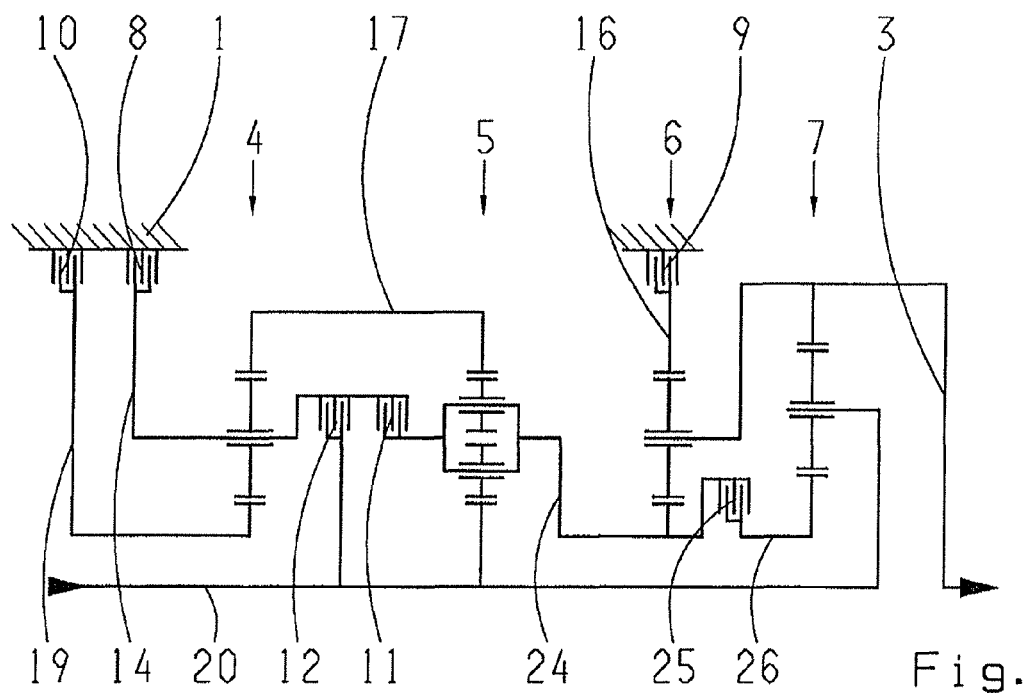
FIG. 4 a schematic view of a third preferred embodiment of a multi-stage transmission according to the invention.

FIG. 4 shows a third preferred embodiment of the multi-stage transmission according to the invention. Here, in contrast to the embodiment according to FIG. 1, a drive shaft 20 is again directly connected to a carrier of the fourth planetary gear set 7. In addition, a fourth shaft 24 can be coupled via a third clutch 25 to a seventh shaft 26, which is connected to a sun gear of the fourth planetary gear set 7.

The embodiment according to FIG. 4 is effectively the same as the variant according to FIG. 1 such that, again, the transmission ratios i and the gear increments φ according to the example shift pattern according to FIG. 2 are attained. With respect to shifting of the individual gears, the example shift pattern according to FIG. 2 is modified in that in each case instead of the third clutch 13 in FIG. 1, the third clutch 25 in FIG. 2 is actuated.

Figure 5:
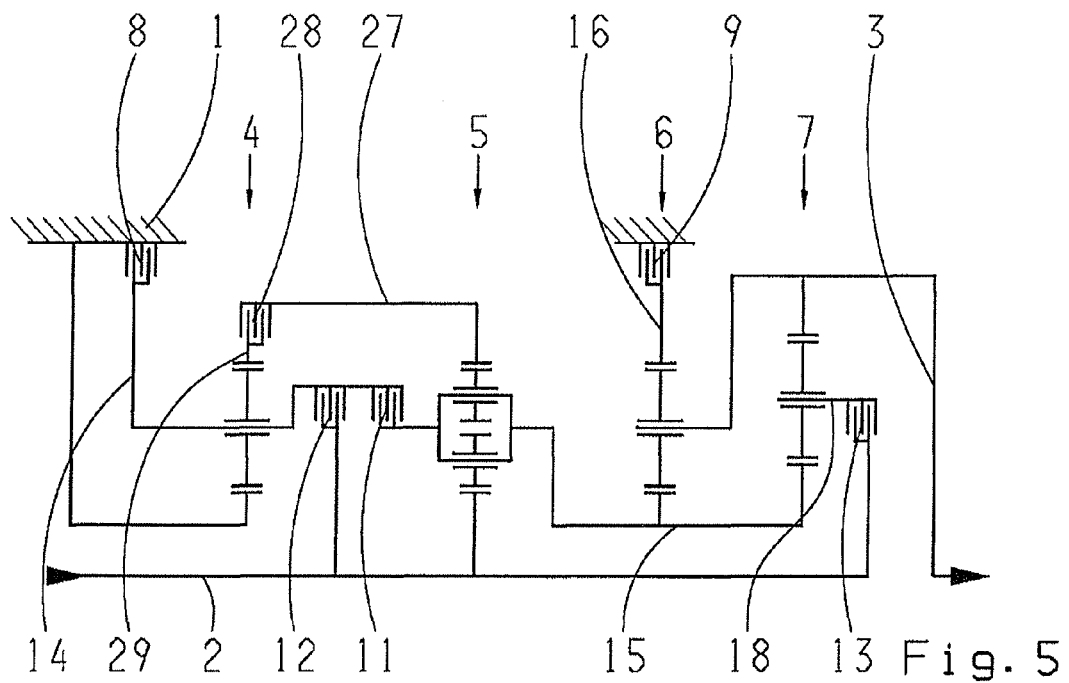
FIG. 5 a schematic view of a fourth preferred embodiment of a multi-stage transmission according to the invention.

FIG. 5 shows a further, fourth embodiment of a multi-stage transmission according to the invention. This embodiment differs from the embodiment according to FIG. 1 in that a sixth shaft 27, along with a connection to a ring gear of the second planetary gear set 5, can be coupled by means of a fourth clutch 28 to an eighth shaft 29, which is connected to a ring gear of the first planetary gear set 4. Furthermore, a sun gear of the first planetary gear set 4 is coupled to the housing 1 in a rotationally fixed manner.

In the case of this embodiment as well, the transmission ratios i of the individual gear steps and the gear increments φ can again be attained according to the example shift pattern according to FIG. 2. With respect to shifting of the individual gears, the description according to FIG. 2 is modified in that, instead of the third brake 10 in FIG. 1, the fourth clutch 28 is actuated in each case.

Figure 6:
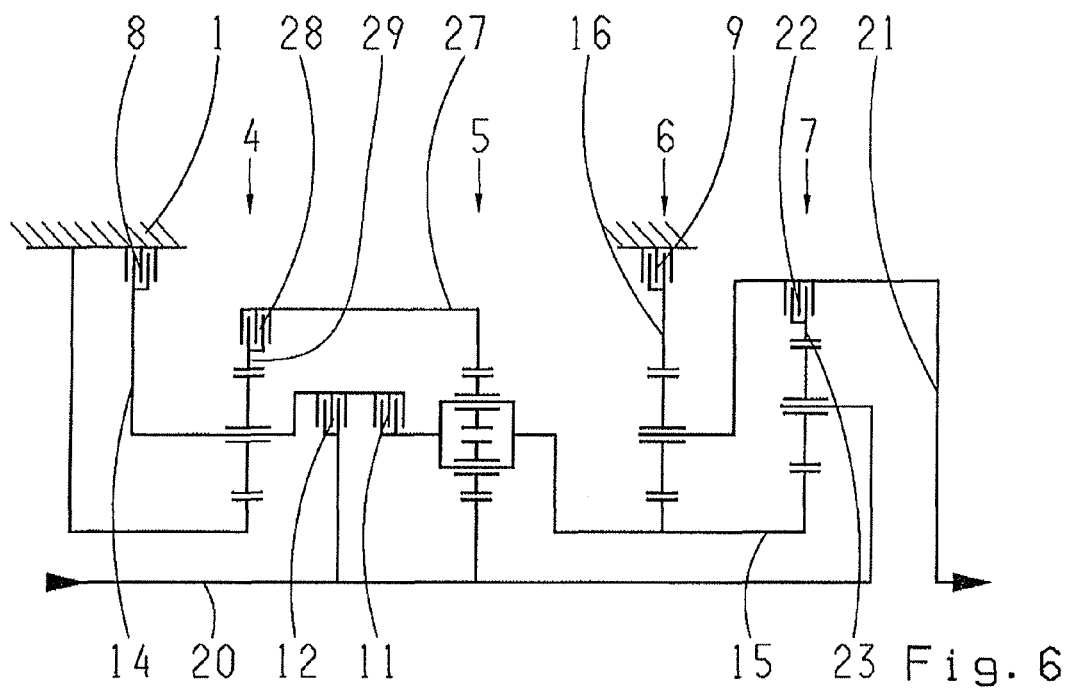
FIG. 6 a schematic view of a further, fifth preferred embodiment of a multi-stage transmission according to the invention.

In addition, FIG. 6 shows a fifth preferred embodiment of a multi-stage transmission according to the invention. In contrast to the embodiment according to FIG. 1, in this case, a drive shaft 20 is connected directly to a carrier of the fourth planetary gear set 7. Additionally, an output shaft 21, along with a coupling to a carrier of the third planetary gear set 6, can be coupled by means of a third clutch 22 to a seventh shaft 23, which is coupled to a ring gear of the fourth planetary gear set 7. In addition, a sixth shaft 27 can be releasably connected by means of a fourth clutch 28 to an eighth shaft 29, which is coupled to a ring gear of the first planetary gear set 4. Finally, a sun gear of the first planetary gear set 4 is connected to the housing 1 in a rotationally fixed manner.

Also in the case of this embodiment, the transmission ratios i in the individual gears and the gear increments φ result according to the example shift pattern according to FIG. 2. Here, the shift pattern is only modified in that instead of the third brake 10 in FIG. 1, the fourth clutch 28 in FIG. 6 is actuated, and instead of the third clutch 13 in FIG. 1, the third clutch 22 in FIG. 6 is actuated.

Figure 7:
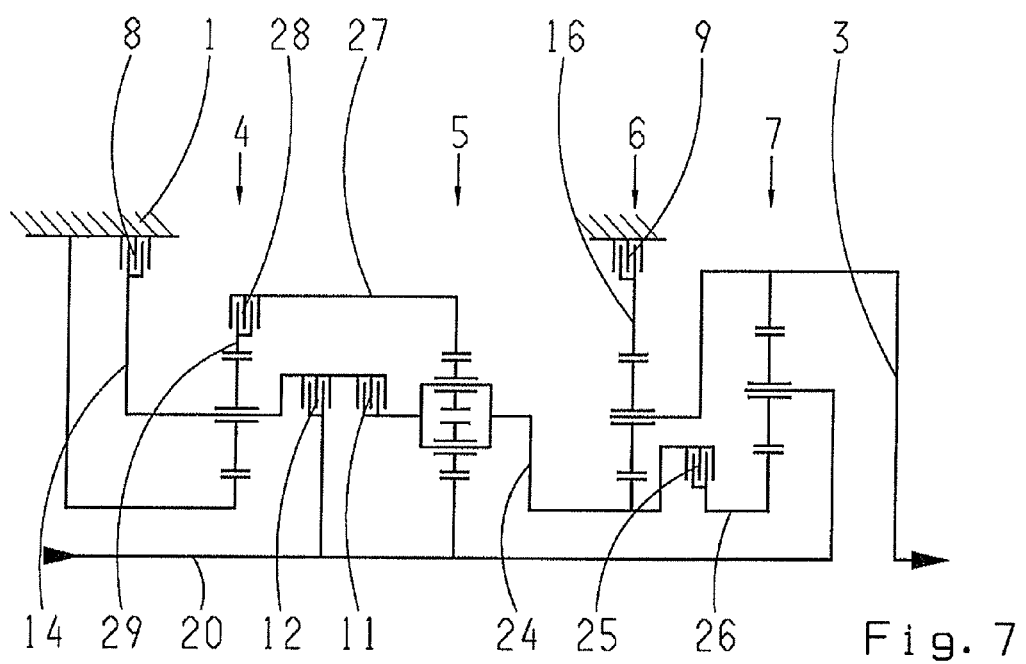
FIG. 7 a schematic view of a sixth preferred embodiment of a multi-stage transmission according to the invention.

Finally, FIG. 7 shows a further, sixth preferred embodiment of a multi-stage transmission according to the invention. This embodiment differs from the embodiment according to FIG. 1 in that a drive shaft 20 is again directly connected to a carrier of the fourth planetary gear set 7. In addition, a fourth shaft 24 can be connected by means of a third clutch 25 to a seventh shaft 26, which is also coupled to a sun gear of the fourth planetary gear set 7. Further, a sixth shaft 27, along with a connection to a ring gear of the second planetary gear set 5, can be coupled via a fourth clutch 28 to an eighth shaft 29, which is connected to a ring gear of the first planetary gear set 4. Finally, a sun gear of the first planetary gear set 4 is coupled to the housing 1 in a rotationally fixed manner.

The transmission ratios i attainable in the individual gears, and the gear increments φ, correspond to the values represented in FIG. 2 due to the embodiment of the transmission according to FIG. 7 being effectively equivalent to the embodiment according to FIG. 1. With respect to shifting the individual gears, the example shift pattern according to FIG. 2 is modified in that, instead of the third brake 10 in FIG. 1, the fourth clutch 28 in FIG. 7 is actuated, and instead of the third clutch 13 in FIG. 1, the third clutch 25 is actuated.

Using the design of a multi-stage transmission according to the invention, an automatic transmission can be attained having low construction costs and low weight. In addition, with the multi-stage transmission according to the invention there are low absolute and relative rotational speeds and low torque at the planetary gear sets and the shift elements. Finally, a good transmission ratio series and good gearing efficiency is attained.

Here the multi-stage transmission according to the invention is preferably suited for a standard longitudinal installation, however, a front transverse design is also conceivable.

According to the invention, different gear increments can also result from the same gear pattern depending on the shift logic, thereby making it possible to realize an application-specific or vehicle-specific variation.

According to the invention, it is also possible to provide additional freewheels at each suitable location of the respective multi-stage transmission, for example, between a shaft and the housing, or possibly to connect two shafts.

According to the invention, an axle differential and/or a distributor differential can be disposed on the drive side or on the output side.

Within the scope of an advantageous further development, the drive shaft 2 or 20 can be separated from a drive engine, as needed, by a clutch element, wherein a hydrodynamic converter, a hydraulic clutch, a dry start-up clutch, a wet start-up clutch, a magnetic powder clutch, or a centrifugal clutch can be used as the clutch element. Additionally, it is also possible to arrange such a start-up element in the power flow direction downstream of the transmission wherein, in this case, the drive shaft 2 or 20 is continuously connected to the crankshaft of the engine.

In addition, it is possible to arrange a torsional vibration damper between the engine and transmission.

Finally, within the scope of the invention, it is also conceivable to arrange a wear-free brake, for instance a hydraulic or electric retarder or the like, on each of the shafts, preferably on the drive shaft 2 or 20, or the output shaft 3 or 21, which is of special significance particularly for use in commercial vehicles. In addition, a power take-off drive can be provided on each of the shafts for operating additional aggregates. Further, an electric machine can be attached to each of the shafts as a generator and/or an additional drive engine.

Obviously, any structural embodiment, in particular any spatial disposition of the planetary gear sets and the shift elements, individually and relative to each other, and insofar as it is technically expedient, falls under the scope of protection of the present claims, without influencing the function of the transmission as specified in the claims, even if these embodiments are not explicitly represented in the figures or in the description.

REFERENCE CHARACTERS

1 housing
2 drive shaft
3 output shaft
4 first planetary gear set
5 second planetary gear set
6 third planetary gear set
7 fourth planetary gear set
8 first brake
9 second brake
10 third brake
11 first clutch
12 second clutch
13 third clutch
14 third shaft
15 fourth shaft
16 fifth shaft
17 sixth shaft
18 seventh shaft
19 eighth shaft
20 drive shaft
21 output shaft
22 third clutch
23 seventh shaft
24 fourth shaft
25 third clutch
26 seventh shaft
27 sixth shaft
28 fourth clutch
29 eighth shaft

The invention claimed is:

1. A multi-step transmission of a planetary design for a motor vehicle, the multi-step transmission comprising:
   a housing (1) accommodating eight rotatable shafts, including a drive shaft (2; 20) and an output shaft (3; 21), and first, second, third and fourth planetary gear sets (4, 5, 6, 7), and at least six shift elements comprising brakes (8, 9, 10; 8, 9) and clutches (11, 12, 13; 11, 12, 22; 11, 12, 25; 11, 12, 13, 28; 11, 12, 22, 28; 11, 12, 25, 28) and, by selective actuation of the at least six shift elements different transmission ratios are implemented between the drive shaft (2; 20) and the output shaft (3; 21), a carrier of the first planetary gear set (4) being connected to a third shaft (14) and the third shaft (14) is connectable, via a first brake (8), to the housing (1) and the third shaft (14) being directly connectable, via of a first clutch (11), to a fourth shaft (15; 24), and the fourth shaft (15; 24) being coupled to a carrier of the second planetary gear set (5), and the third shaft (14) also being connectable, via a second clutch (12), to the drive shaft (2; 20), a ring gear of the third planetary gear set (6) being coupled to a fifth shaft (16) and the fifth shaft (16) is connectable, via a second brake (9), to the housing (1), the drive shaft (2; 20) being coupled to a sun gear of the second planetary gear set (5), and a ring gear of the second planetary gear set (5) being connected to a sixth shaft (17; 27), wherein the second planetary gear set (5) is a plus planetary gear set.

2. The multi-stage transmission according to claim 1, wherein the fourth shaft (15) additionally connects a sun gear of the third planetary gear set (6) to a sun gear of the fourth planetary gear set (7), the sixth shaft (17) is connected to a ring gear of the first planetary gear set (4), the drive shaft (2) is connectable, via a third clutch (13), to a seventh shaft (18) and the seventh shaft (18) is connected to a carrier of the fourth planetary gear set (7), the output shaft (3) connects a ring gear of the fourth planetary gear set (7) to a carrier of the third planetary gear set (6), and a sun gear of the first planetary gear set (4) is coupled to an eighth shaft (19) and the eighth shaft (19) is connectable, via a third brake (10), to the housing (1).

3. The multi-stage transmission according to claim 1, wherein the fourth shaft (15) additionally connects a sun gear of the third planetary gear set (6) to a sun gear of the fourth planetary gear set (7), the sixth shaft (17) is connected to a ring gear of the first planetary gear set (4), the drive shaft (20) is coupled to a carrier of the fourth planetary gear set (7), the output shaft (21) is operatively connected to a carrier of the third planetary gear set (6) and is connectable, via a third clutch (22), to a seventh shaft (23) and the seventh shaft (23) is coupled to a ring gear of the fourth planetary gear set (7), and a sun gear of the first planetary gear set (4) is coupled to an eighth shaft (19) and the eighth shaft (19) is connectable, via a third brake (10), to the housing (1).

4. The multi-stage transmission according to claim 1, wherein the fourth shaft (24) is additionally coupled to a sun gear of the third planetary gear set (6) and is connectable, via a third clutch (25), to a seventh shaft (26) and the seventh shaft (26) is connected to a sun gear of the fourth planetary gear set (7), the sixth shaft (17) is connected to a ring gear of the first planetary gear set (4), the drive shaft (20) is connected to a carrier of the fourth planetary gear set (7), the ring gear of the fourth planetary gear set (7) is connected, via the output shaft (3), to a carrier of the third planetary gear set (6), and a sun gear of the first planetary gear set (4) is coupled to an eighth shaft (19) and the eighth shaft (19) is connectable to the housing (1) via a third brake (10).

5. The multi-stage transmission according to claim 2, wherein a first forward gear is obtained by engaging the second brake (9) and the third brake (10) and the first clutch (11);

a second forward gear is obtained by engaging the second brake (9), and the first clutch (11) and the second clutch (12);

a third forward gear is obtained by engaging the second brake (9) and the third brake (10), and the second clutch (12);

a fourth forward gear is obtained by engaging the second brake (9), and the second clutch (12) and third clutch (13; 22; 25);

a fifth forward gear is obtained by engaging the third brake (10), and the second clutch (12) and third clutch (13; 22; 25);

a sixth forward gear is obtained by engaging the first, the second and the third clutches (11, 12, 13; 11, 12, 22; 11, 12, 25);

a seventh forward gear is obtained by engaging the third brake (10), and the first clutch (11) and the third clutch (13; 22; 25);

an eighth forward gear is obtained by engaging the first brake (8), and the first clutch (11) and the third clutch (13; 22; 25);

a ninth forward gear is obtained by engaging the first brake (8) and the third brake (10), and the third clutch (13; 22; 25), and a reverse gear is obtained by engaging the first, the second and the third brakes (8, 9, 10).

6. The multi-stage transmission according to claim 1, wherein the fourth shaft (15) additionally connects a sun gear of the third planetary gear set (6) to a sun gear of the fourth planetary gear set (7), the drive shaft (2) is connectable, via a third clutch (13), to a seventh shaft (18) and the seventh shaft (18) is connected to a carrier of the fourth planetary gear set (7), a ring gear of the first planetary gear set (4) is coupled to an eighth shaft (29) and the eighth shaft (29) is connectable, via a fourth clutch (28), to the sixth shaft (27), the output shaft (3) connects a ring gear of the fourth planetary gear set (7) to a carrier of the third planetary gear set (6), and a sun gear of the first planetary gear set (4) is fixedly coupled to the housing (1).

7. The multi-stage transmission according to claim 1, wherein the fourth shaft (15) connects a sun gear of the third planetary gear set (6) to a sun gear of the fourth planetary gear set (7), the output shaft (21) is coupled to a carrier of the third planetary gear set (6) and is connectable, via a third clutch (22), to a seventh shaft (23) and the seventh shaft (23) is connected to a ring gear of the fourth planetary gear set (7), a ring gear of the first planetary gear set (4) is coupled to an eighth shaft (29) and the eight shaft (29) is connectable, via a fourth clutch (28), to a sixth shaft (27), the drive shaft (20) is coupled to a carrier of the fourth planetary gear set (7), and a sun gear of the first planetary gear set (4) is fixedly connected to the housing (1).

8. The multi-stage transmission according to claim 1, wherein the fourth shaft (24) is coupled to a sun gear of the third planetary gear set (6) and is connectable, via a third clutch (25), to a seventh shaft (26) and the seventh shaft (26) is connected to a sun gear of the fourth planetary gear set (7), a ring gear of the first planetary gear set (4) is coupled to an eighth shaft (29) and the eight (29) is connectable, via a fourth clutch (28), to the sixth shaft (27), the output shaft (3) couples a ring gear of the fourth planetary gear set (7) to a carrier of the third planetary gear set (6), the drive shaft (20) is connected to a carrier of the fourth planetary gear set (7), and a sun gear of the first planetary gear set (4) is fixedly coupled to the housing (1).

9. The multi-stage transmission according to claim 6, wherein a first forward gear is obtained by engaging the second brake (9), and the first clutch (11) and the fourth clutch (28);

a second forward gear is obtained by engaging the second brake (9), and the first clutch (11) and the second clutch (12);

a third forward gear is obtained by engaging the second brake (9), and the second clutch (12) and the fourth clutch (28);

a fourth forward gear is obtained by engaging the second brake (9), and the second clutch (12) and the third clutch (13; 22; 25);

a fifth forward gear is obtained by engaging the second clutch (12), the third clutch (13; 22; 25) and the fourth clutch (28);

a sixth forward gear is obtained by engaging the first clutch (11), the second clutch (12), and the third clutch (13; 22; 25);

a seventh forward gear is obtained by engaging the first clutch (11), the third clutch (13; 22; 25) and the fourth clutch (28);

an eighth forward gear is obtained by engaging the first brake (8), and the first clutch (11) and the third clutch (13; 22; 25);

a ninth forward gear is obtained by engaging the first brake (8) and the third clutch (13; 22; 25) and the fourth clutch (28); and a reverse gear is obtained by engaging the first and the second brakes (8, 9), and the fourth clutch (28).

10. The multi-stage transmission according to claim 1, wherein the shift elements are implemented either as one of multi-disk shift elements and claw shift elements.

11. A multi-step transmission of planetary design for a motor vehicle, the multi-step transmission comprising:
a housing (1);
a drive shaft (2; 20), an output shaft (3; 21), and third, fourth, fifth, sixth, seventh and eight rotatable shafts;
first, second, third, and fourth planetary gear sets (4, 5, 6, 7), each of the first planetary gear set, the second planetary gear set, the third planetary gear set, and the fourth planetary gear set comprising a sun gear, a ring gear and a carrier, and the second planetary gear set (5) is a plus planetary gear set;
only six shift elements comprising at least first and second brakes (8, 9, 10; 8, 9) and at least first, second, third clutches (11, 12, 13; 11, 12, 22; 11, 12, 25; 11, 12, 13, 28; 11, 12, 22, 28; 11, 12, 25, 28), and selective engagement of the at least six shift elements implements different transmission ratios between the drive shaft (2; 20) and the output shaft (3; 21);
the drive shaft (2; 20) being coupled to the sun gear of the second planetary gear set (5);
the third shaft (14) being continually connected to the carrier of the first planetary gear set (4) and being directly connectable, via the first brake (8), to the housing (1), and the third shaft (14) is directly connectable, via the first clutch (11), to the fourth shaft (15; 24), and the third shaft (14) is directly connectable, via the second clutch (12), to the drive shaft (2; 20);
the fourth shaft (15; 24) being directly coupled to a carrier of the second planetary gear set (5);
the fifth shaft (16) being coupled to the ring gear of the third planetary gear set (6) and being connectable, via the second brake (9), to the housing (1); and
the sixth shaft (17; 27) being connected to the ring gear of the second planetary gear set (5).

12. The multi-stage transmission according to claim 11, wherein
the output shaft (3) is continually connected to the ring gear of the fourth planetary gear set (7) and the carrier of the third planetary gear set (6);
the fourth shaft (15) is continually connected to the sun gear of the third planetary gear set (6) and the sun gear of the fourth planetary gear set (7);
the sixth shaft (17) is continually connected to the ring gear of the first planetary gear set (4);
the seventh shaft (18) is continually connected to the carrier of the fourth planetary gear set (7) and is connectable, via the third clutch (13), to the drive shaft (3); and
the eighth shaft (19) is continually connected to the sun gear of the first planetary gear set (4) and is connectable, via a third brake (10), to the housing (1).

13. A multi-step transmission of a planetary design for a motor vehicle, the multi-step transmission comprising:
a housing (1) accommodating eight rotatable shafts, including a drive shaft (2; 20) and an output shaft (3; 21), and first, second, third and fourth planetary gear sets (4, 5, 6, 7), and only a total of six shift elements comprising brakes (8, 9, 10; 8, 9) and clutches (11, 12, 13; 11, 12, 22; 11, 12, 25; 11, 12, 13, 28; 11, 12, 22, 28; 11, 12, 25, 28) and, by selective actuation of the six shift elements different transmission ratios are implemented between the drive shaft (2; 20) and the output shaft (3; 21);
a carrier of the first planetary gear set (4) being connected to a third shaft (14), the third shaft (14) being directly connectable, via a first brake (8), to the housing (1); the third shaft (14) also being connectable, via of a first clutch (11), to a fourth shaft (15; 24), and the fourth shaft (15; 24) being directly connected to a carrier of the second planetary gear set (5); and the third shaft (14) also being directly connectable, via a second clutch (12), to the drive shaft (2; 20); and,
a ring gear of the third planetary gear set (6) being coupled to a fifth shaft (16) and the fifth shaft (16) is connectable, via a second brake (9), to the housing (1);
the drive shaft (2; 20) being coupled to a sun gear of the second planetary gear set (5);
a ring gear of the second planetary gear set (5) being connected to a sixth shaft (17; 27) which is connected to the ring gear of the first planetary gear set (4); and
the second planetary gear set (5) being a plus planetary gear set.

14. The multi-stage transmission according to claim 11, wherein the sixth shaft (17; 27) is directly connected to the ring gear of the first planetary gear set (4).

15. The multi-stage transmission according to claim 11, wherein the sixth shaft (17; 27) is connected to the ring gear of the first planetary gear set (4) via a further clutch.

\* \* \* \* \*